June 25, 1963

H. W. MOORE 3,095,160

TRAVERSING MECHANISM FOR TRANSFORMER COIL WINDING MACHINE

Filed May 22, 1958

INVENTOR.
HARRY W. MOORE
BY
HIS ATTORNEYS

June 25, 1963

H. W. MOORE 3,095,160

TRAVERSING MECHANISM FOR TRANSFORMER COIL WINDING MACHINE

Filed May 22, 1958

INVENTOR.
HARRY W. MOORE
BY
HIS ATTORNEYS

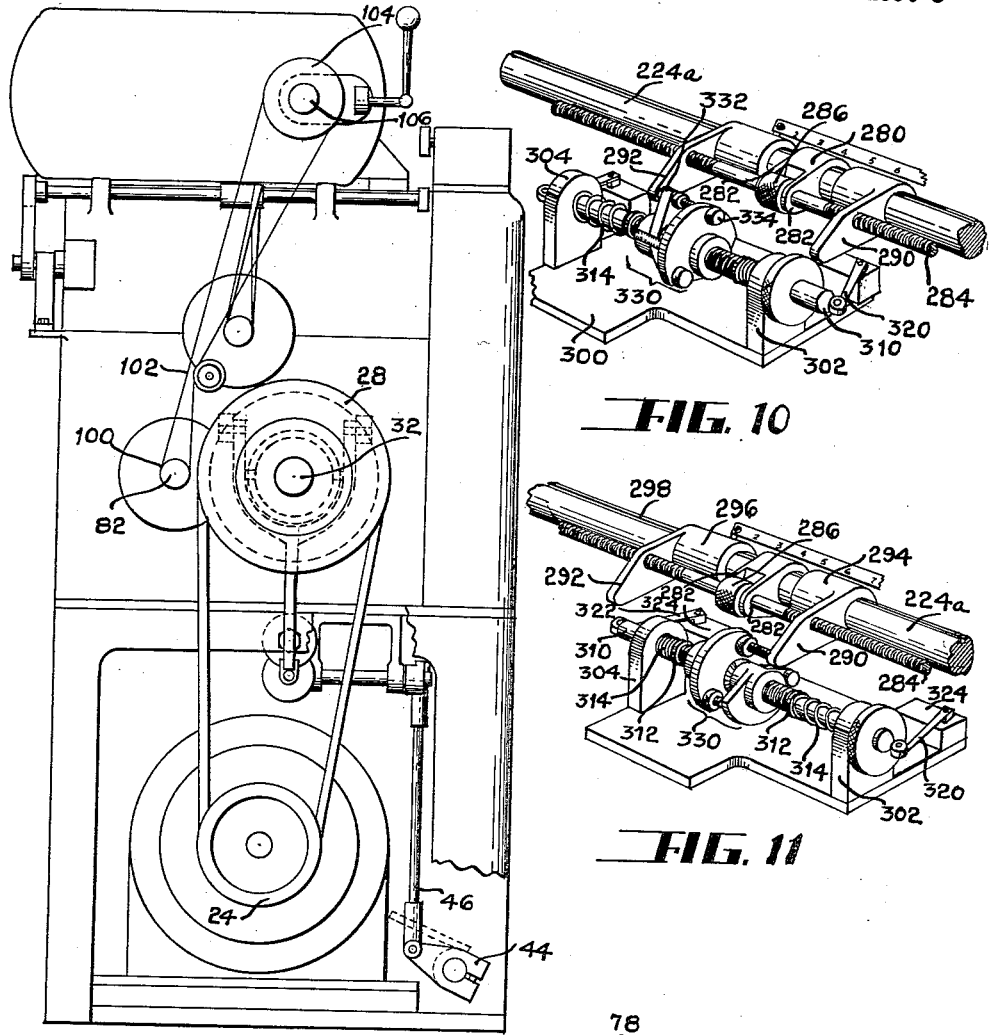

June 25, 1963

H. W. MOORE 3,095,160

TRAVERSING MECHANISM FOR TRANSFORMER COIL WINDING MACHINE

Filed May 22, 1958

INVENTOR.
HARRY W. MOORE

BY

HIS ATTORNEYS

United States Patent Office 3,095,160
Patented June 25, 1963

3,095,160
TRAVERSING MECHANISM FOR TRANSFORMER
COIL WINDING MACHINE
Harry W. Moore, 5051 Kittridge Road, Dayton 24, Ohio
Filed May 22, 1958, Ser. No. 737,079
3 Claims. (Cl. 242—158.2)

This invention relates to a coil winding machine and more particularly to a coil winding machine for winding the coils for transformers, although not necessarily so limited, in that the same coil winding mechanism may be used for winding other coils than transformer coils.

In the manufacture of transformers there may be a primary winding having one type of wires or conductors and a secondary winding having another type of wires or conductors. For carrying heavy currents, large conductors are used. These, oftentimes, are associated with lower voltages. When the currents are smaller, smaller conductors are used. In transformers one winding may be a high voltage winding and a comparatively low current winding. The other winding may be a low voltage winding; but a high current winding. That being the case, a primary winding may be wound from one type of wire and the secondary winding wound from another type of wire, the relative sizes being dependent upon whether the transformer is a step-up or a step-down transformer.

An object of this invention is to provide a coil winding machine that is adapted to wind both the primary winding and the secondary winding of a transformer with the minimum amount of time required for resetting the machine for winding the two types of windings. In shifting from one type of winding to another, the number of turns in each layer of windings depends on the size of the wire. When fine wires are used, a great number of turns may be laid in the same layer. When heavy conductors are used, as for example, flat band wires, only a few turns are laid in each layer. That being the case, the rate at which the traversing mechanism is driven must be altered. Furthermore, the limits must also be altered, in that the traversing mechanism must be adjusted to position the wire, such that the distance from the center of the wire of the last convolution to the margin of the form is equal to half the thickness of the wire. If a thin wire is used, the traversing mechanism must travel farther than if a heavy wire is used. Also, it may be desirable to change the rate of speed at which the coil winding machine is driven. If fine wires are used, many more turns are required. The machine may then be driven at a much higher rate of speed than if heavy flat bands of wire were used.

Another object of this invention is to provide a safety device which automatically opens the main clutch and applies a brake, so that in the event of an accident, the machine is automatically stopped.

Other objects and advantages reside in the construction of parts, the combination thereof, the method of manufacture and the mode of operation, as will become more apparent from the following description.

Referring to the drawings, FIGURE 1 is a top plan view of a portion of the machine, with parts shown in section.

FIGURE 4 is an end elevational view, as viewed from the left of FIGURE 3, with parts broken away.

FIGURE 5 is a fragmentary view, taken substantially on the line 5—5 of FIGURE 3.

Figure 2:
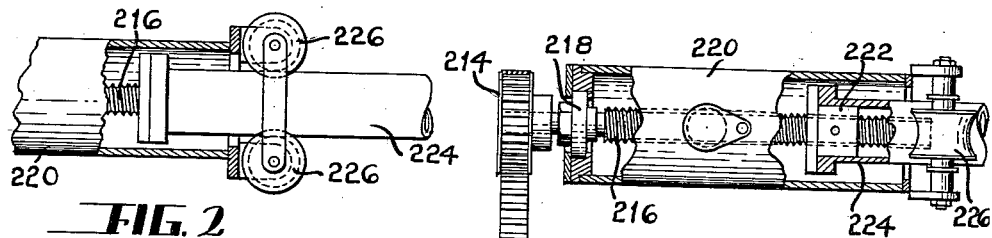
FIGURE 2 is a fragmentary side elevational view of a part of the wire traversing mechanism.

FIGURE 10 discloses the reversing mechanism for the wire traversing mechanism when the traversing mechanism is in one extreme position.

FIGURE 11 discloses the traversing mechanism and the reversing mechanism therefor, when the traversing mechanism is in the opposite end of its travel.

This invention pertains primarily to a machine for winding the primary and the secondary windings on the transformers. In a step-down transformer, the high voltage winding is usually made from many turns of a comparatively light weight wire, that is, light weight as compared to the low voltage wire. This high voltage winding may consist of two or three or more wires wound simultaneously and in parallel. The low voltage winding utilizes heavy weight wire, oftentimes in the form of a ribbon. Two or more of these ribbons may be wound simultaneously. That being the case, there will be only a few turns in each layer. As a matter of fact, in some cases the winding is the width of the coil, that is, the winding is made from a sheet of sheet material. Between layers of windings there is usually a strip of insulating material, as for example, a strip of paper. This strip of paper is preferably the width of the entire coil, so that the strip of paper is placed in position, then the next layer is wound over the paper functioning as an insulator.

The coil winding machine disclosed herein is driven from a common source of power, as for example, an electric motor. A clutch and brake mechanism is used for connecting and disconnecting the driven mechanism from the source of power. Variable speed controls are used in driving the cores and in driving the wire traversing mechanism. The ratio of the speed of the traversing mechanism with respect to the speed of the core receiving the winding is a high ratio when winding one type of coil and a very low ratio when winding another type of coil. That is, when the high voltage coil is wound, the speed of the core is much higher than when winding the low voltage side of the transformer. On the other hand, the traversing mechanism travels at a slow rate of speed when winding the high voltage coil and travels at a high rate of speed when winding the low voltage coils, which will appear more fully from the description that follows.

In the drawings, the reference numeral 20 indicates a housing for an electric motor 22. The output shaft of the motor 22 is provided with pulleys 24 driving a plurality of V-belts 26 trained over V-belt pulleys 28. These V-belt pulleys 28 are connected by a clutch plate 30 to a shaft 32. This clutch plate 30 is both manually and automatically controlled by a clutch controlled mechanism, which will now be described.

A foot pedal 40 connected to a shaft 42 is used in controlling the clutch. It is quite desirable that the clutch plate 30 be actuated towards the pulleys 28 and 29 slowly, so as to gradually increase the speed of the mechanism from zero to full speed. This, of course, could theoretically be controlled by moving the foot pedal 40 rather rapidly and then gradually slow the movement of the foot pedal. However, this is not very satisfactory, in that it is preferable to move the foot pedal 40 downwardly at a substantially uniform rate of speed. This has been accomplished by a link and an eccentric mechanism which includes a link 44 keyed to the end of the shaft 42. As best seen in FIGURES 4 and 5, the link 44 is provided with an arm portion having pivotally attached thereto a link 46 pivotally attached to a crank arm 48. This crank arm 48 drives an eccentric cam element 50 located in a circular opening in a bracket 51 connected to a cylinder 52 having a piston rod 54 connected to an arm or sear 56 provided with a yoke pivoted at 58 and provided with a pin 60 seated in the slot actuating the clutch plate 30. The piston in the cylinder 52 is generally energized with a hydraulic fluid (it may be air or liquid), so as to hold the piston in the outer end of the cylinder, excepting in the case of an emergency, which will be described more fully later.

After the machine attains full speed, a cylinder 61 provided with a piston 62 is energized so as to cause the large end of the piston rod 62 to engage the sear 56, so that when the operator releases his foot from the pedal 40, the clutch is held in position. The cylinder 61 is energized when the piston rod 54 actuates the sear 56 to engage the clutch.

Associated with the pedal is an elongated rod 70 which functions as a safety device, the opposite ends of the rod 70 being provided with downwardly projecting portions 72 pivoted at 74, only one of the downwardly projecting portions and one of the pivots being shown in the drawings.

As may be clearly seen in FIGURE 5, the downwardly projecting portion 72 of the safety rod 70 is aligned with an arm 76 of a microswitch 78. When the microswitch 78 is energized, that is, when the safety rod 70 comes in contact with the arm 76 to close the switch 78, the cylinders 52 and 61 are then automatically collapsed, so as to withdraw the sear 56 and open the clutch plate 30 from the pulleys and, at the same time, apply a brake to the machine, so as to suddenly stop the machine. If, for example, the operator should get a portion of his garments, as for example, his sleeve, caught by one of the cores being wound and thereby pull it towards the machine, his body would automatically be pulled against or fall against the horizontal portion 70 of the safety rod, pushing this safety rod towards the machine to thereby energize the microswitch 78 to forcibly stop the machine.

The use of an eccentric 50 for actuating the sear 56 may be referred to as a sine wave motion imparted to the clutch. At first, the eccentric is very effective and, as it is turned so as to approach a 90° turn, the movement approaches zero, as is well known to any one familiar with the operation of eccentrics. By this arrangement, it is possible to engage the clutch very gradually, even though the pedal 40 be actuated at a compartively uniform rate of speed. This permits the clutch plates to engage slowly after coming in contact, thereby permitting the clutch to slip to gradually accelerate the coil winding machine during the period that the clutch plates begin to grab until the plates are locked together.

Within the casing 80 is a gear shift, not shown, connecting the shaft 32 to a shaft 82. This gear shift is controlled by the gear shift lever 84. When this gear shift lever is in the vertical position, the gears are in neutral position. When it is tilted to the left into the position shown in FIGURE 3, a low speed gear ratio connects the shaft 32 to the shaft 82. When the lever 84 is shifted to the right, the two shafts are connected by a high speed gear ratio for purposes that will appear more fully later.

Between the shaft 82 and the spindle 90 supporting the forms 92 shown in dotted lines, there is a two shift gear ratio. This is controlled by the gear shift lever 94. When the lever 94 is in the vertical position, it is in neutral position. When tilted to the left into the position shown in FIGURE 3, a low speed ratio connects the shaft 82 to the spindle 90. When shifted towards the right, the shaft 82 is connected to the spindle by a high speed gear ratio. The reason for this last gear shift ratio, that is, the gear shift ratio between the shaft 82 and the spindle 90, is the fact that when winding the high voltage side of a transformer, the form 92 is then rotated at a high rate of speed and the wire traversing mechanism is actuated at a compartively low rate of speed, in that a small wire is used. On the other hand, when the low voltage winding is wound, the form is rotated very slowly and the wire traversing mechanism travels more rapidly. The mechanism for driving the wire traversing mechanism will now be described.

Figure 1:
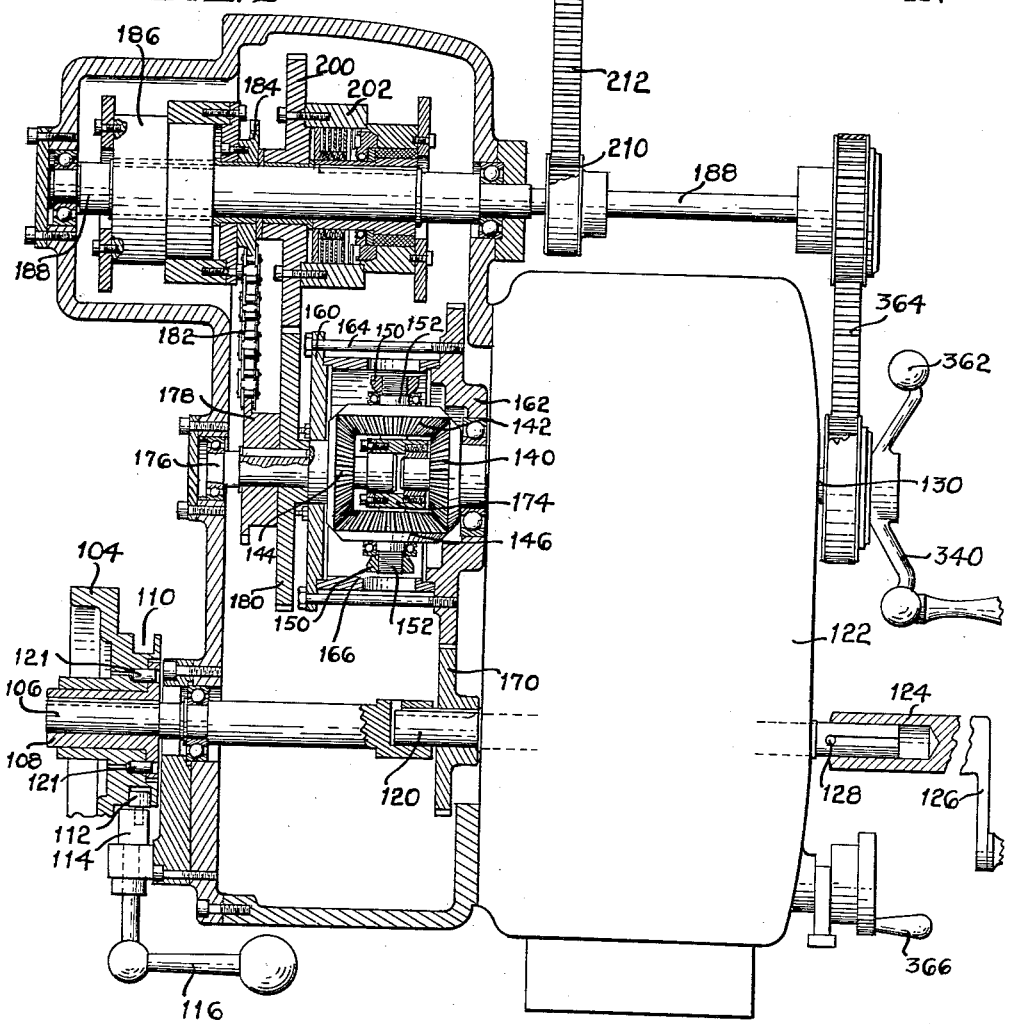

The shaft 82 supports a pulley 100 driving a toothed belt 102 which, in turn, passes over a pulley 104 mounted on a shaft 106. The pulley 104 is connected to the flange of a sleeve 108 keyed to the shaft 106. The pulley 104 is provided with an annular channel 110 that receives an eccentric 112 mounted in a clutch releasing member 114 actuated by a lever 116. A pair of pins 121 project into the apertures of the flange of sleeve 108 when the clutch is engaged, as shown in FIGURE 1. By rotating the lever 116 through substantially 180°, the pulley 104 is disconnected from the sleeve 108 and from the shaft 106. The shaft 106 is coupled to a second shaft 120 journalled in a housing 122. The outer end of the shaft 120 has mounted thereon a sleeve 124 connected to a hand crank handle 126. By disconnecting the pulley 104 from the shaft 106 and by shoving the sleeve 124 inwardly so as to engage a pin 128, the shaft 120 may be rotated by the hand crank 126 for the purpose of adjustment and for the purpose of setting the speed mechanism to obtain the proper speed of the wire traversing mechanism.

In the housing 122 there is what is generally referred to as a Reeves type gear shift located between the shaft 120 and a shaft 130. By actuating the clutch releasing member 114 to release the pins 121, the Reeves gear mechanism may be actuated by the crank 126. Furthermore, the Reeves change speed mechanism may be adjusted by a pair of adjusting members 132 and 134 to adjust relative speed between the shaft 120 and the shaft 130. The crank 366, upon being rotated 180°, releases the belt-like driving members of the Reeves gear shift to facilitate the changing of the output speed to the input speed.

The shaft 130 has its outer end, shown to the left of FIGURE 1, connected to a differential mechanism including the bevelled gears 140, 142, 144 and 146. Members 150 are lock nuts threadedly engaging shafts 152 supporting the planetary gears 142 and 146. The gear 144 is keyed to a plate 160 connected to a gear 162 by a plurality of bolts 164. The plate 160 is held in spaced relation from the gear 162 by a cylindrical sleeve 166. The gear 162 is driven from a gear 170 keyed to the shaft 120. If the speed of the gear 140 driven from the Reeves speed change mechanism and that of the gear 144 driven from the shaft 120 are equal in opposite direction, the planetary gears 142 and 146 will not rotate. As soon as there is a difference in the speed of the two, the planetary gears will begin to rotate.

The shafts 152 are attached to an internally mounted spider 174 that is keyed to a shaft 176, so that the shaft 176 only rotates when there is a differential in the speed of the two gears 140 and 144. The shaft 176 is keyed to a sprocket wheel 178 and a gear 180, and sprocket wheel 178 drives a chain 182 driving a sprocket wheel 184 connected to an electromagnetic clutch 186 that drives a shaft 188 when the electromagnetic clutch is energized. The gear 180 meshes with a gear 200 connected to an electromagnetic clutch 202 that drives the same shaft 188 when the electromagnetic clutch 202 is energized. The sprocket wheel 178 and the gear 180 rotate in the same direction. The electromagnetic clutch 186 drives the shaft 188 in the same direction as the direction of rotation of the sprocket wheel 178 and the gear 180. The gear 180, meshing with the gear 200, drives the shaft 188 in the opposite direction when the electromagnetic clutch 202 is energized. That being the case, only one of the electromagnetic clutches 186 and 202 can be energized at a time.

The shaft 188 supports a gear 210 driving a chain link belt 212 passing over a gear 214 driven by the belt 212, as clearly shown in FIGURE 1. The gear 214 is keyed to a shaft 216 journalled in the bearing 218 that is mounted in the end of the housing 220. The shaft 216 is threaded, so as to threadedly engage a threaded nut 222 fixedly attached in the end of a tubular sleeve 224 guided by a pair of rollers 226. This tubular sleeve merges into a solid bar portion 224a. The threaded shaft 216 is used in actuating the tubular sleeve 224 which drives the wire traversing mechanism and has its outer end 224a connected to the first traversing mechanism 230, only one of which has been shown.

Figure 6:
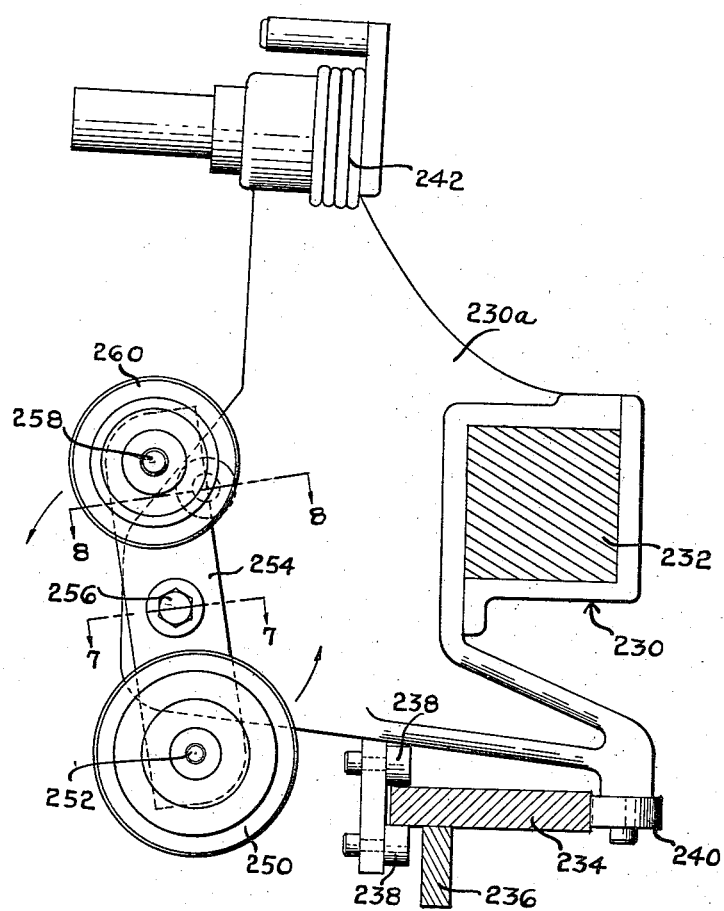
FIGURE 6 is a sectional view, taken substantially on the line 6—6 of FIGURE 3, showing the wire traversing mechanism and parts supported thereby.
Figure 8:
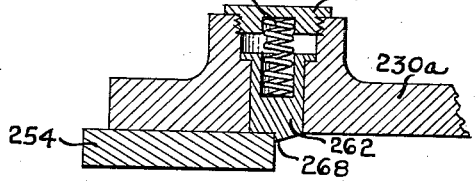
FIGURE 8 is a cross sectional view, taken substantially on the line 8—8 of FIGURE 6.
Figure 7:
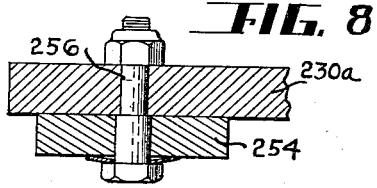
FIGURE 7 is a cross sectional view, taken substantially on the line 7—7 of FIGURE 6.
Figure 9:
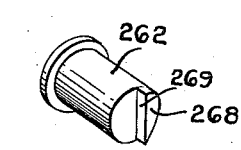
FIGURE 9 is a perspective view of a latch pin.

The several traversing mechanisms are connected together by a bar 232, best seen in FIGURE 6. As clearly shown in FIGURE 6, these traversing mechanisms are guided upon a rail 234 reinforced by a vertical bar 236. A pair of rollers 238, one located below the rail 234 and one located above the rail 234, supports the weight of the traversing mechanism 230. A roller 240 engages the rear edge of the rail 234, so as to align the traversing mechanism with the rail. This traversing mechanism includes a tensioning device 242 that may be any conventional tensioning device.

Referring to FIGURES 6 to 9 inclusive, the wire passes over the tensioning device 242, under the wire guide pulley 250 journalled on a pintle 252 secured to a bar 254 pivoted at 256. The upper end of the bar 254 supports another pintle 258 having journalled thereon a wire guide pulley 260. The bar 254 is mounted for pivotal movement about the pivot 256, so as to present either the wire guiding pulley 250 or the wire guiding wheel or pulley 260 into operative position.

The bar 254 is prevented from rotation in a counterclockwise direction, as viewed in FIGURE 6, by a latch including a spring urged pin 262 seated in member 230a of the traversing mechanism 230 and held therein by a cap 264 and a compression spring 266. As may best be seen in FIGURES 8 and 9, the pin 262 is provided with a bevelled portion 268 terminating in a shoulder 269 against which the bar 254 is positioned. After one of the windings has been wound and it is desirable to wind another winding, the bar 254 is rotated in a counterclockwise direction, as viewed in FIGURE 6, to position the wire guiding pulley or wheel 260 in the position now occupied by the wire guiding wheel 250.

Figure 3:
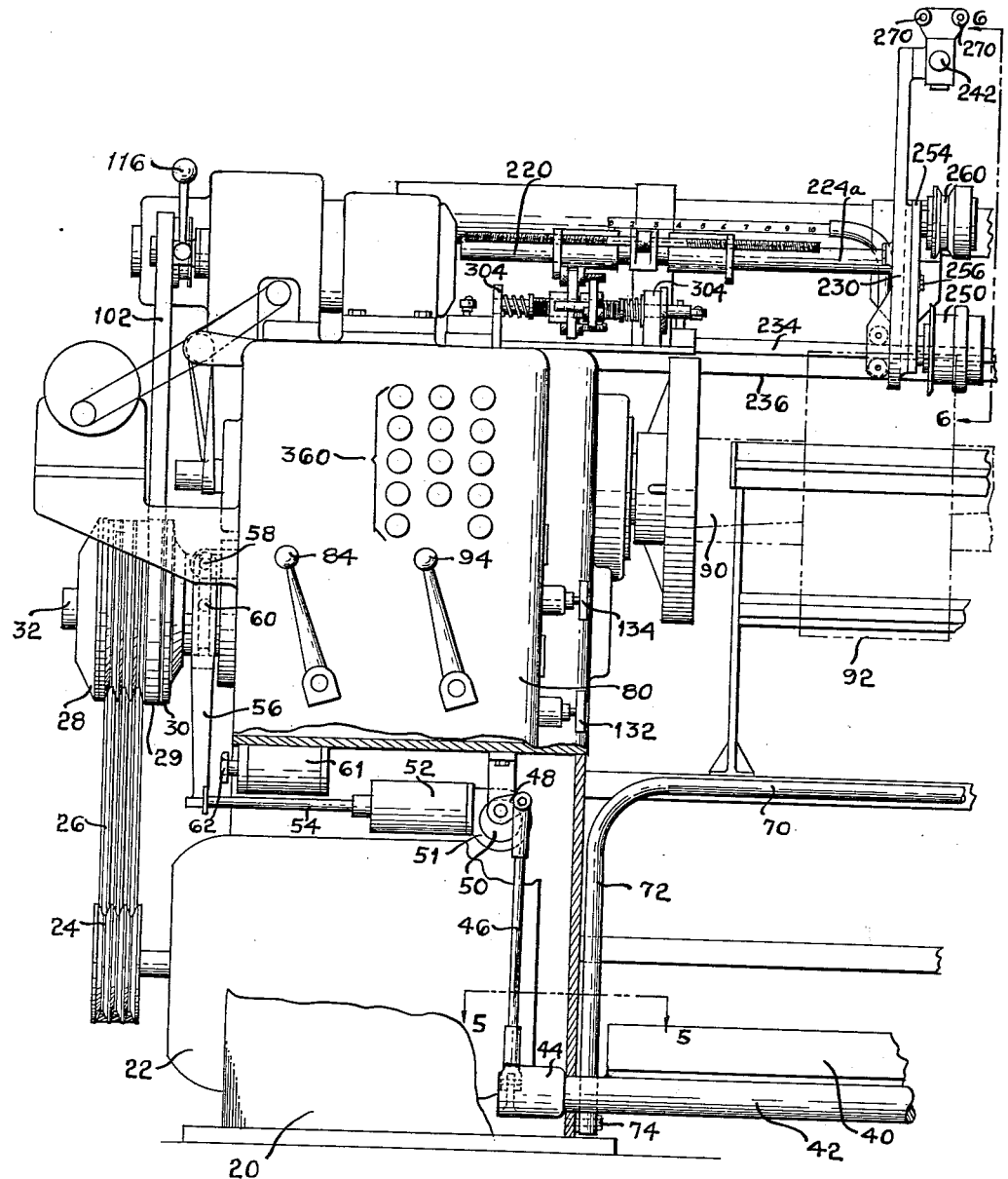
FIGURE 3 is a front elevational view with parts broken away and some parts shown in section.

As may best be seen by referring to FIGURE 3, the wire guiding wheel or pulley 250 is provided with a wide passage for the wire and is adapted to feed a ribbon-like wire that may be used in a low voltage winding of a transformer. The guide pulley 260 is provided with a narrow groove adapted to feed a round small conductor that may be used in the high voltage side of a transfomer. When the necessary number of low voltage windings have been wound on the transformer, the bar 254 is rotated through an angle of 180°, so as to position the wire guiding wheel 260 in guiding position, that is, the lower position, where it guides the wire used for high voltage windings. The transformer may be wound in various ways, as is well known to those skilled in the art. First, a few turns of low voltage, then the high voltage, then there may be more turns of low voltage, depending entirely upon the particular design of windings used in the transformer. Usually, the layers of each winding extend the entire width of the form.

As best seen in FIGURE 6, the wire used in winding a form is fed from a source of supply (not shown) that may be located above the floor above the machine, so that the wire is fed downwardly between two guide rollers 270, between the tensioning device 242, downwardly under the wire guide pulley 250 or 260, as the case may be, and forwardly into the form 92, shown schematically in FIGURE 3. The form is rotated so as to pull the wire. When a whole gang of forms are wound simultaneously, the wire traversing mechanism feeds the wire so as to lay the wire or wires side by side on the form until the layer is completed. Then a piece of insulation material is inserted over the layer and a second layer, using the same type of wire in continuous length, is then wound in position, the wire traversing mechanism feeding the wire in a movement in the opposite direction.

When heavy wire is fed and a number of traversing mechanisms are used so as to wind a number of coils, the total pull on the wire may equal a ton. In spite of this pull, the roller 240 engaging the rail 234 being mounted on roller bearings (not shown), the traversing mechanism may be actuated by a force exerted by one finger. This is accomplished by the particular mounting of the traversing mechanism. The device for reversing the movement of the traversing mechanism will now be described.

As best seen in FIGURES 3, 10 and 11, a bracket 280 is fixedly attached to the bar 224a. Member 280 is provided with a pair of bifurcations 282, rotatably supporting a shaft 284. A finger driven wheel 286 is mounted on the shaft 284 between the furcations 282. The outer ends of the shaft 284 are threaded, one end having a right hand thread and the other end a left hand thread, so as to threadedly engage the extensions 290 and 292 extending from tubular sleeves 294 and 296 respectively. These tubular sleeves 294 and 296 are slidably mounted upon the bar 224a and are provided with keys seated in the longitudinally extending key slot 298 in the bar 224a, so that the sleeves 294 and 296 may slide along the bar axially, but are non-rotatably supported on the bar.

A switch control mechanism is mounted between the extensions 290 and 292. This switch control mechanism is mounted upon a base 300 provided with upwardly directed standards 302 and 304. These standards 302 and 304 are provided with apertures in which a shaft 310 is mounted. This shaft is provided with a pair of collars 312, each abutting a compression spring 314 biasing the shaft 310 into a neutral and central position. The arms 320 and 322 of a pair of micro-switches 324 are aligned with the ends of the shaft 310. These micro-switches may be identical. The center portion of the shaft 310 is threaded and has mounted thereon a plurality of cam-like members collectively shown at 330. These cams are mounted for rotation on the shaft 310 and normally locked together. When these cams are in the position shown in FIGURE 10, the shaft 310 is driven towards the right, as viewed in FIGURE 10. When the extension 292 driven by the traversing drive mechanism engages the stop 332, so as to actuate the shaft 310 by compressing one of the compression springs 314 towards the right, as viewed in FIGURE 10, to actuate the switch arm 320 to close the micro-switch connected thereto to reverse the direction of rotation of the wire traversing mechanism by de-energizing one of the clutches, either 186 or 202, as the case may be, and energize the other one of these two clutches, the direction of rotation of the threaded shaft 216 (shown in FIGURE 1) is reversed, thereby driving the tubular sleeve 224 in the opposite direction. As the traversing bar advances in the opposite direction, namely, to the left, as viewed in FIGURE 10, the extension 290 will engage an abutment 334, so as to actuate the shaft 310 from the neutral position to engage the switch arm 322, energizing the micro-switch 324 located towards the left, to reverse the clutch connections and thereby reverse the traversing mechanism.

It so happens that the spacing of the winding due to differences in width thereof is not the same for the high tension winding and the low tension winding. When one winding has been completed and it is desirable to adjust the device to wind the other type of winding, the cam members 330 are then rotated on the shaft 310 through a suitable angle, so as to cause the extensions 290 nad 292 to engage a pair of abutment members which have been so adjusted that the reversing of the traversing mechanism will take place at the proper time. It is not only necessary to adjust the traversing mechanism when shifting from one winding to another winding. When the low voltage or low tension winding is being wound, which may consist of a conductor that may be ribbon-like, it may be necessary to shift the traversing mechanism from one extreme position to the other.

When one winding is completed, for example, a low voltage winding, it may be necessary to shift the mechanism from one side to the other. This is accomplished by de-energizing both of the clutches 186 and 202 by pushing the appropriate push button, shown in the bank of control push buttons 360 shown in FIGURE 3, so as to de-energize both of the clutches. Then, by actuating the clutch lever 362, shown in FIGURE 1, and rotating the crank 340, the traversing mechanism is then manually driven from the chain link belt 364, driving the shaft 188, in turn driving the chain link belt 212 and the shaft 216 in the proper direction to actuate the traversing mechanism from one extreme position to the other.

It is also necessary to adjust the speed of the form. When winding the low voltage winding, the form is generally rotated rather slowly, in that the ribbon-like copper bars, or whatever metal they happen to be, are quite stiff and tensioned in such a manner that the bars conform to the form. When winding the high tension side or the high voltage winding, the forms may be rotated at a much higher speed; but the traversing mechanism reduces its rate of travel, in that the high tension wires are much smaller and there are many more convolutions per layer. The speed of the forms is controlled by one of the levers 84 or 94. The speed of the traversing mechanism is controlled by adjusting the speed of the Reeves gear changing mechanism. This is accomplished by actuating the crank 366, shown in FIGURE 1, which releases the tension on the belts used in the Reeves gear drive, so as to permit adjustment of the gear drive by rotating the crank handle 126 to the proper position. Suitable indicators (not shown) may be used to indicate the position to which the Reeves mechanism is to be adjusted. Also, it is not necessary to rotate the bar 254 through 180° to position the proper guide wire pulley for the particular winding to be used. After the new winding has been fastened in position, the winding machine may be started by connecting the various clutches by means of the clutch levers or by pushing the appropriate push buttons in the group of control push buttons 360, with the exception of the main clutch, which is controlled by the foot pedal 40.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A device for reversing the direction of movement of the wire traversing mechanism of a coil winding machine, said device including a pair of brackets, means for adjustably mounting the brackets upon the traversing mechanism, said brackets being arranged in spaced relation from each other, a switch control mechanism having a pair of stops selected from a plurality of pairs of differentially spaced stops mounted between the brackets, yieldable means for supporting the pairs of stops, said stops being mounted for movement from inoperative position to operative position and vice versa, each pair of stops being mounted for lateral adjustment on the yieldable supporting means, a pair of reversing switches mounted adjacent the support means so that as one of the brackets engages one of the selected stops the support means moves into engagement with one of the reversing switches to reverse the traversing mechanism.

2. A device for reversing the direction of movement of the wire traversing mechanism of a coil winding machine, said device including a pair of brackets, means for adjustably mounting the brackets upon the traversing mechanism, said brackets being arranged in spaced relation from each other, a switch control mechanism having a pair of stops selected from a plurality of pairs of stops mounted in the path of the brackets, yieldable means for supporting the pairs of stops, said stops being mounted for movement from inoperative position to operative position and vice versa, each pair of stops being mounted for lateral adjustment on the yieldable supporting means, a pair of reversing switches mounted adjacent the support means so that as one of the brackets engages one of the selected stops the support means moves into engagement with one of the reversing switches to reverse the traversing mechanism.

3. A device for reversing the direction of movement of the wire traversing mechanism of a coil winding machine, said device including a pair of brackets, means for adjustably mounting the brackets upon the traversing mechanism, said brackets being arranged in spaced relation from each other, a switch control mechanism having a pair of stops selected from a plurality of pairs of stops mounted between the brackets, said switch control mechanism including a shaft, a pair of brackets slidably mounting the shaft, a pair of spaced switches, means including a pair of compression springs engaged with said last mentioned brackets for holding the shaft between and in engagement with said switches whereby each switch is engaged by one end of the shaft, said stops being symmetrically mounted upon the shaft centrally between the switches and rotatable to select a pair of stops for engagement by said first mentioned brackets, the shaft being movable with the stops, one of the first mentioned brackets engaging one of the stops of the selected pair of stops at the end of one stroke of the traversing mechanism and the other stop of the selected pair of stops engaging the other bracket when the traversing mechanism reaches the end of the stroke in the opposite direction.

References Cited in the file of this patent

UNITED STATES PATENTS

| | | |
|---|---|---|
| 943,042 | Newton | Dec. 4, 1909 |
| 1,053,962 | Alexander | Feb. 25, 1913 |
| 1,702,627 | Bronander | Feb. 19, 1929 |
| 1,917,905 | Schellenbach | July 11, 1933 |
| 2,161,459 | Demay | June 6, 1939 |
| 2,229,988 | Pitt et al. | Jan. 28, 1941 |
| 2,254,221 | Hubbard | Sept. 2, 1941 |
| 2,410,026 | Groene et al. | Oct. 29, 1946 |
| 2,462,393 | Haynes | Feb. 22, 1949 |
| 2,692,738 | Seaman | Oct. 26, 1954 |
| 2,699,297 | Weinreich et al. | Jan. 11, 1955 |
| 2,713,980 | Roberts et al. | July 26, 1955 |
| 2,757,770 | Robertson | Aug. 7, 1956 |
| 2,796,794 | Bruegger | June 25, 1957 |
| 2,818,952 | Ross | Jan. 7, 1958 |
| 2,836,370 | Drees et al. | May 27, 1958 |